(12) United States Patent
Haller

(10) Patent No.: US 10,808,535 B2
(45) Date of Patent: Oct. 20, 2020

(54) BLADE STRUCTURE FOR TURBOMACHINE

(71) Applicant: General Electric Company, Schenectady, NY (US)

(72) Inventor: Brian Robert Haller, Market Rasen (GB)

(73) Assignee: General Electric Company, Schenectady, NY (US)

( * ) Notice: Subject to any disclaimer, the term of this patent is extended or adjusted under 35 U.S.C. 154(b) by 135 days.

(21) Appl. No.: 16/143,753

(22) Filed: Sep. 27, 2018

(65) Prior Publication Data

US 2020/0102829 A1 Apr. 2, 2020

(51) Int. Cl.
| | | |
|---|---|---|
| *F01D 5/14* | (2006.01) | |
| *F01D 5/06* | (2006.01) | |
| *F01D 9/04* | (2006.01) | |

(52) U.S. Cl.
CPC ............. *F01D 5/06* (2013.01); *F01D 5/143* (2013.01); *F01D 5/145* (2013.01); *F01D 9/041* (2013.01); *F05D 2220/31* (2013.01); *F05D 2220/3212* (2013.01); *F05D 2240/12* (2013.01); *F05D 2240/301* (2013.01); *F05D 2240/307* (2013.01)

(58) Field of Classification Search
CPC . F01D 5/06; F01D 5/143; F01D 5/145; F01D 9/041; F05D 2220/31; F05D 2220/3212; F05D 2240/12; F05D 2240/301; F05D 2240/307
See application file for complete search history.

(56) References Cited

U.S. PATENT DOCUMENTS

| | | | | |
|---|---|---|---|---|
| 6,036,438 | A | 3/2000 | Imai | |
| 6,508,630 | B2 * | 1/2003 | Liu | ............... F01D 5/145 416/228 |
| 8,177,496 | B2 * | 5/2012 | Wilson | ............... F02K 3/06 415/181 |
| 8,602,727 | B2 * | 12/2013 | Bahadur | ............... F01D 5/141 415/192 |
| 2006/0083613 | A1 * | 4/2006 | Cunha | ............... F01D 5/081 416/97 R |

(Continued)

FOREIGN PATENT DOCUMENTS

| | | |
|---|---|---|
| EP | 0704602 A2 | 4/1996 |
| EP | 0704602 A3 | 7/1996 |

(Continued)

OTHER PUBLICATIONS

EP Search Report and Written Opinion for corresponding EP Patent Application No. 19199707.1 dated Dec. 3, 2019, 12 pages.

*Primary Examiner* — Aaron R Eastman
(74) *Attorney, Agent, or Firm* — Charlotte Wilson; Hoffman Warnick LLC

(57) ABSTRACT

The disclosure provides a blade with an airfoil including: a root region at a first radial end; a tip region at a second radial end opposite the first radial end; and a midspan region between the root region and the tip region and at least one endwall connected with the root region or the tip region of the airfoil along the suction side, the pressure side, the trailing edge and the leading edge, wherein the midspan region includes a reduced axial width relative to an axial width of the root region and an axial width of the tip region, and a reduced opening-to-pitch ratio at the midspan region relative to the root and tip regions.

19 Claims, 9 Drawing Sheets

(56) References Cited

U.S. PATENT DOCUMENTS

2012/0183411 A1*  7/2012  Haller .................... F01D 9/041
                                              416/243
2012/0288365 A1* 11/2012  Bagnall ................. F01D 5/141
                                              415/208.1
2016/0146013 A1   5/2016  Haller

FOREIGN PATENT DOCUMENTS

| EP | 1422382 A1 | 5/2004 |
| EP | 2476862 A1 | 7/2012 |
| EP | 3124794 A1 | 2/2017 |
| EP | 3358134 A  | 8/2018 |
| JP | 2005315178 A | 11/2005 |

\* cited by examiner

BLADE STRUCTURE FOR TURBOMACHINE

TECHNICAL FIELD

The subject matter disclosed herein relates to turbomachines. More particularly, the subject matter disclosed herein relates to components within any type of turbomachine, including without limitation gas and/or steam turbines.

BACKGROUND

Some aircraft and/or power plant systems, for example certain jet aircraft, or nuclear, simple cycle and combined cycle power plant systems, employ turbines (also referred to as turbomachines) in their design and operation. Some of these turbines employ airfoils (e.g., stationary or rotating turbine blades) which during operation are exposed to fluid flows. These airfoils are configured to aerodynamically interact with the fluid flows and generate shaft power (e.g., creating thrust, turning kinetic energy to mechanical energy, thermal energy to mechanical energy, etc.) from these fluid flows as part of power generation. As a result of this interaction and conversion, the aerodynamic characteristics and losses of these airfoils will affect system and turbine operation, performance, thrust, efficiency, and power.

SUMMARY

A first aspect of the invention includes a blade structure adapted for placement within a flowpath of a turbomachine, the blade structure including: an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region; and at least one endwall connected with the root region or the tip region of the airfoil along the suction side, the pressure side, the trailing edge and the leading edge, wherein the midspan region includes a reduced axial width relative to an axial width of the root region and an axial width of the tip region, and a blade opening-to-pitch ratio of the airfoil at the midspan region is greater than the blade opening-to-pitch ratio of the airfoil at the root region and the tip region to concentrate a fluid flow within the flowpath toward the midspan region of the airfoil compared to the root region and the tip region, and wherein the midspan region creates an axial width differential between the root region and the tip region reduces fluid flow profile loss across the midspan region relative to the root region and the tip region.

A second aspect of the invention includes a static nozzle section within a flowpath of a turbomachine, the static nozzle section including: a set of static nozzles, the set of static nozzles including at least one nozzle having: an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region and at least one endwall connected with the root region or the tip region of the airfoil along the suction side, pressure side, trailing edge and the leading edge, wherein an intersection angle between the leading edge of the airfoil and the at least one endwall is between approximately 10 degrees and approximately 35 degrees, wherein the midspan region includes a reduced axial width relative to an axial width of the root region and an axial width of the tip region, and a blade opening-to-pitch ratio of the airfoil at the midspan region is greater than the blade opening-to-pitch ratio of the airfoil at the root region and the tip region to concentrate a fluid flow within the flowpath toward the midspan region of the airfoil compared to the root region and the tip region, and wherein the midspan region creates an axial width differential between the root region and the tip region reduces fluid flow profile loss across the midspan region relative to the root region and the tip region.

A third aspect of the invention includes a turbine section within a flowpath of a turbomachine, the turbine section comprising: a set of rotatable blades, the set of rotatable blades including at least one blade structure having: an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region and at least one endwall connected with the root region or the tip region of the airfoil along the suction side, pressure side, trailing edge and the leading edge, wherein an intersection angle between the leading edge of the airfoil and the at least one endwall is between approximately 2.5 degrees and approximately 20 degrees, wherein the midspan region includes a reduced axial width relative to an axial width of the root region and an axial width of the tip region, and a blade opening-to-pitch ratio of the airfoil at the midspan region is greater than the blade opening-to-pitch ratio of the airfoil at the root region and the tip region to concentrate a fluid flow within the flowpath toward the midspan region of the airfoil compared to the root region and the tip region, and wherein the midspan region creates an axial width differential between the root region and the tip region reduces fluid flow profile loss across the midspan region relative to the root region and the tip region.

BRIEF DESCRIPTION OF THE DRAWINGS

These and other features of this invention will be more readily understood from the following detailed description of the various aspects of the invention taken in conjunction with the accompanying drawings that depict various embodiments of the present disclosure, in which.

Figure 1:
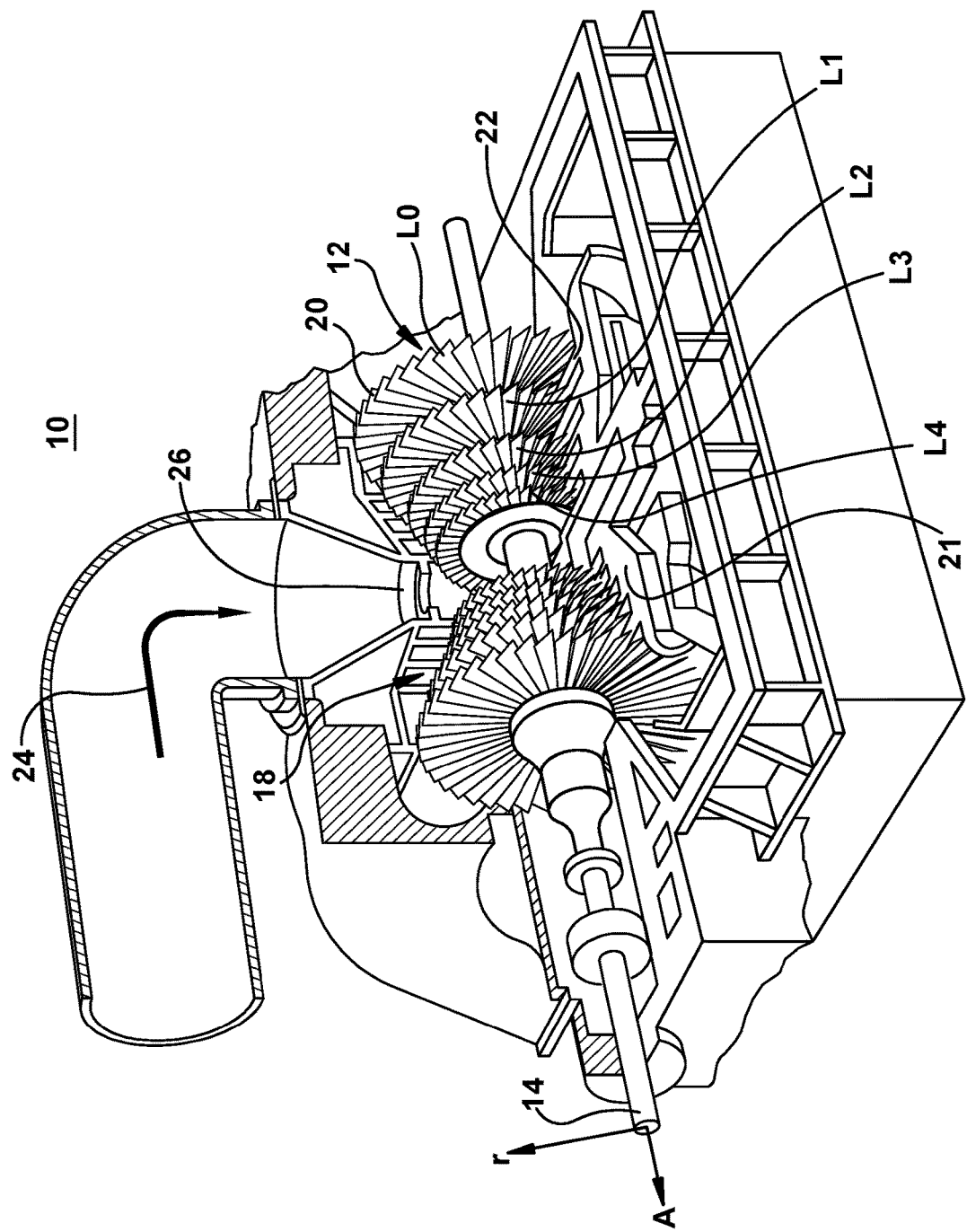
FIG. 1 shows a three-dimensional partial cut-away perspective view of a portion of a turbine according to an embodiment of the present disclosure.

It is noted that the drawings of the present disclosure are not necessarily to scale. The drawings are intended to depict only typical aspects of the present disclosure, and therefore should not be considered as limiting the scope of the present disclosure. It is understood that elements similarly numbered between the FIGS. may be substantially similar as described with reference to one another. Further, in embodiments shown and described with reference to FIGS. 1-9, like numbering may represent like elements. Redundant explanation of these elements has been omitted for clarity. Finally, it is understood that the components of FIGS. 1-9 and their accompanying descriptions may be applied to any embodiment described herein.

DETAILED DESCRIPTION

As noted herein, various aspects of the invention are directed toward blade structures for turbomachines. Particular aspects of the invention include blade structures having a reduced axial width in their midspan region, relative to the root and tip regions of the blade.

In contrast to conventional turbine nozzles, aspects of the invention include a blade structure (e.g., a static nozzle or rotatable blade for directing a working fluid such as gas or steam) having a midspan region with a reduced axial width and greater blade opening-to-pitch ratio relative to root and tip regions located near opposing endwalls. Differences in the blade opening-to-pitch ratio across the airfoil will control nearby airflow to concentrate operative fluid toward the midspan region of the airfoil. The concentrations in airflow may enhance performance, efficiency and/or durability of the blade structure (and associated turbine stages and turbine machines). Diverting a fluid flow from the root region or tip region of a blade structure will provide more flow at the relatively efficient midspan region of the blade, and less flow through the high secondary loss regions near the endwall(s) of the airfoil.

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location. Further, the term leading edge refers to surfaces which are oriented predominately upstream relative to the fluid flow of the system, and the term trailing edge refers to surfaces which are oriented predominately downstream relative to the fluid flow of the system. In addition to the foregoing, it is noted that direction "r" denotes a radial direction, direction "A" denotes the axial direction, and direction "Y" denotes the circumferential direction where applicable.

In the following description, reference is made to the accompanying drawings that form a part thereof, and in which is shown by way of illustration specific embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Referring to the drawings, FIG. 1 shows a perspective partial cut-away illustration of a turbine 10 (e.g., a steam turbine) according to various embodiments of the invention. The view of turbine 10 may represent a high pressure (HP), intermediate pressure (IP), or low pressure (LP) turbine, and it is understood that embodiments of the disclosure may be especially applicable to HP and IP turbines. Turbine 10 includes a rotor 12 that includes a rotating shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A static nozzle section 21 is shown including a plurality of stationary nozzles 22 that extend circumferentially around shaft 14, and the nozzles 22 are axially positioned between adjacent rows of blades 20. Stationary nozzles 22 cooperate with blades 20 to form a stage of turbine 10, and to define a portion of a flow path through turbine 10. As shown, static nozzle section 21 at least partially surrounds the rotor 12 (shown in this cut-away view).

It is understood that turbine 10 shown is a dual-flow turbine 10 that includes an axially centered inlet mouth which feeds two sets of turbine stages. It is understood that various teachings can be applied to axial turbines, e.g., axial inlet gas turbines that inlet a combustion gas from a first axial end and outlet that combustion gas to a second axial end after the gas has performed mechanical work on the turbine. During operation, an operative fluid such as steam 24 enters an inlet 26 of turbine 10 and is channeled through stationary nozzles 22. Nozzles 22 direct steam 24 against blades 20. Steam 24 passes through the remaining stages imparting a force on blades 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine. In other embodiments, turbine 10 may comprise an aircraft engine used to produce thrust or an industrial gas turbine.

Figure 2:
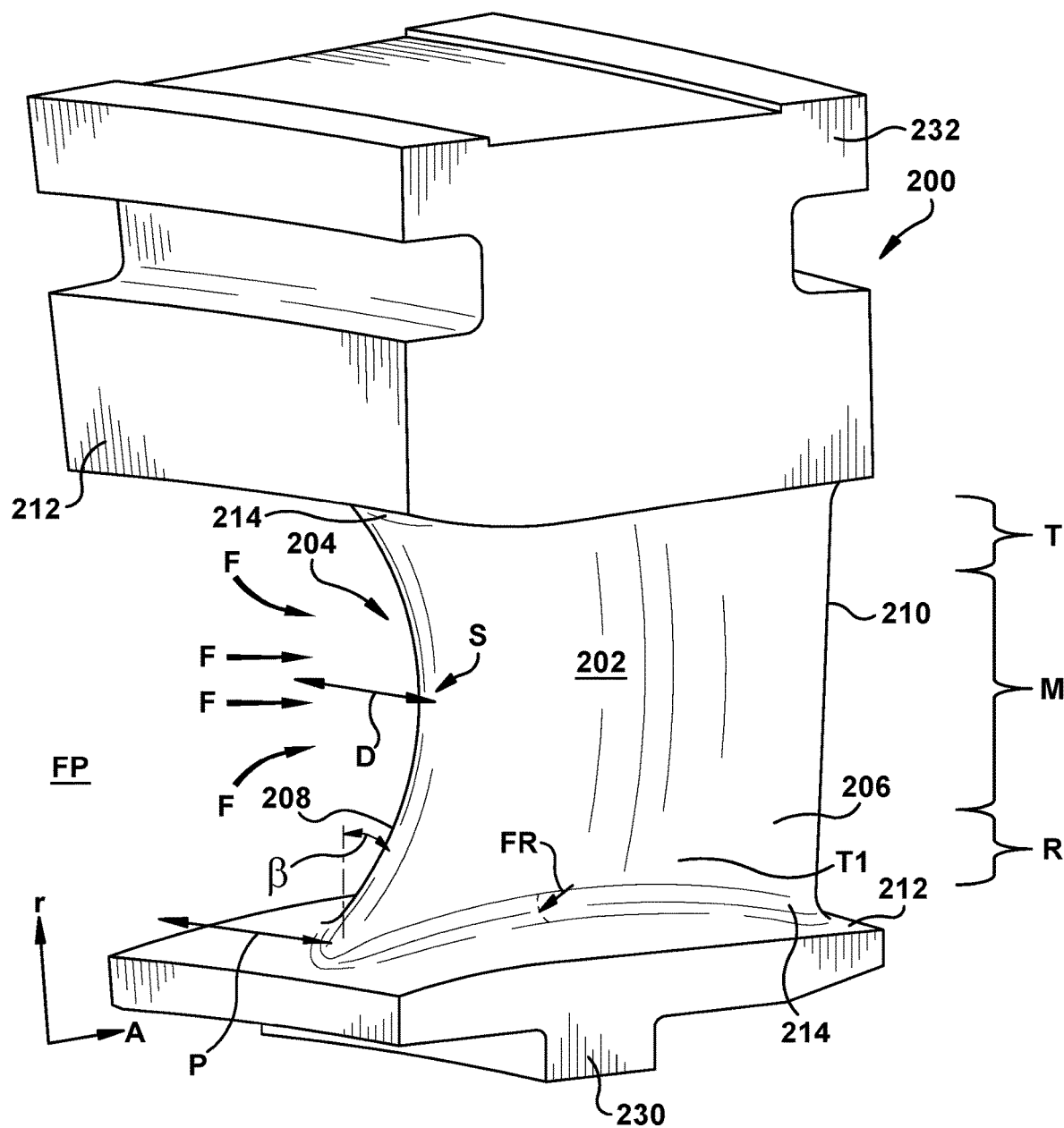
FIG. 2 shows a schematic three-dimensional depiction of a turbine nozzle including an airfoil and endwalls according to various embodiments of the present disclosure.
Figure 3:
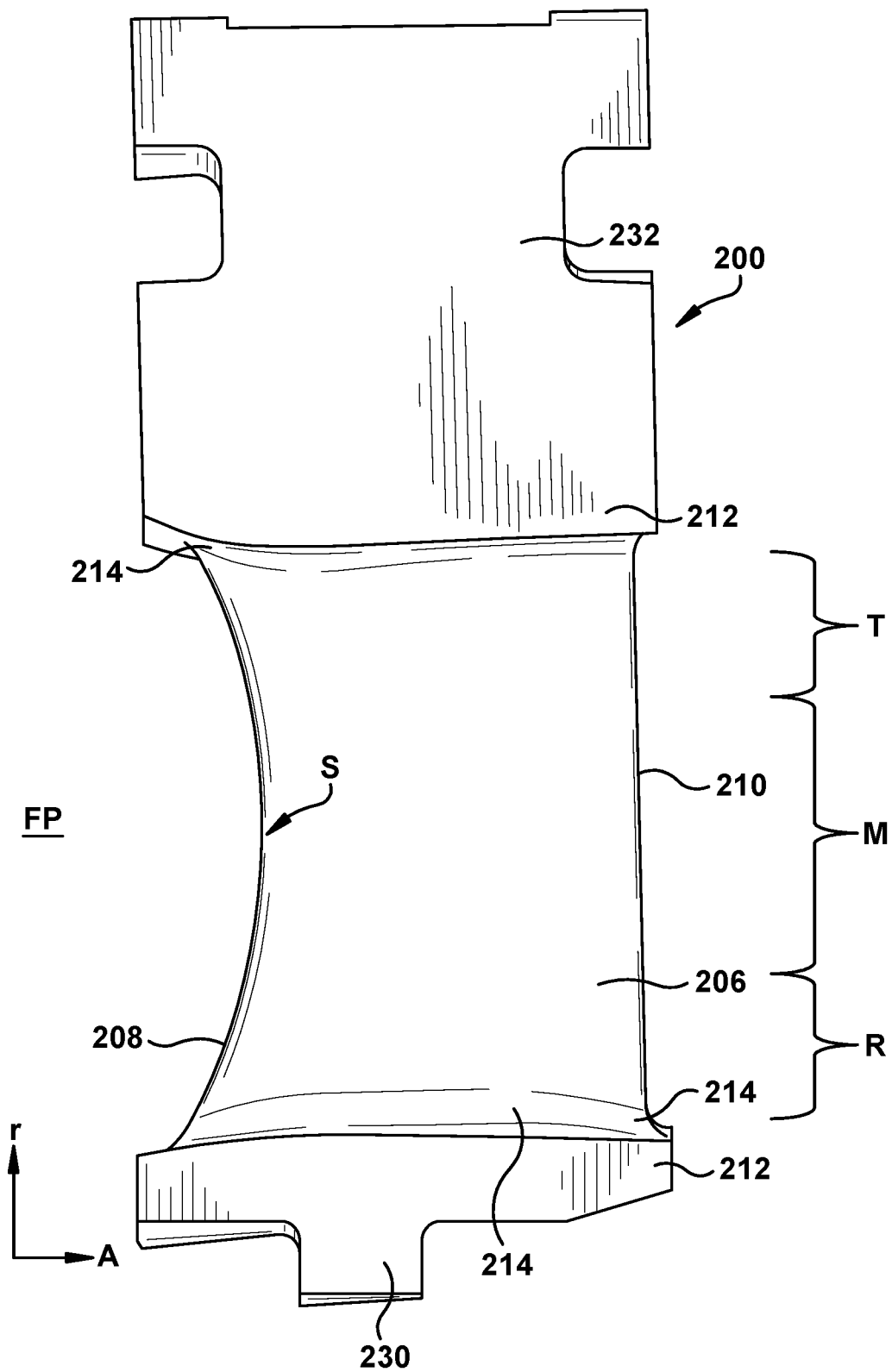
FIG. 3 shows a two-dimensional side view of a turbine nozzle including an airfoil and endwalls according to various embodiments of the present disclosure.

Turning to FIGS. 2 and 3, a schematic three-dimensional depiction of a blade structure (or simply, structure) 200 is shown according to various embodiments. Structure 200 may represent a static or rotatable blade adapted for placement within a flowpath (FP) of a device, e.g., turbine 10 (FIG. 1). In the example of FIG. 2, structure 200 may be a static nozzle included in an annulus of stationary nozzles in a stage of a turbine (e.g., turbine 10). That is, during operation of a turbine (e.g., turbine 10), structure 200 may remain stationary in order to direct the flow of working fluid (e.g., gas or steam) to one or more movable blades (e.g., blades 20), causing those movable blades to initiate rotation of a rotor shaft (e.g., shaft 14). It is understood that structure 200 is configured to couple (mechanically couple via fasteners, welds, slot/grooves, etc.) with a plurality of similar or distinct nozzles (e.g., blade structures 200 or other nozzles) to form an annulus of nozzles in a stage of the turbine.

Turbine structure 200 includes an airfoil 202 having a suction side surface 204, and a pressure side surface 206 (partially obscured in FIG. 2, not visible in FIG. 3) opposing suction side surface 204. Structure 200 can also include a leading edge 208 between pressure side surface 206 and suction side surface 204, and a trailing edge 210 opposing leading edge 208 and between pressure side surface 206 and suction side surface 204. Airfoil 202 may have a hollow interior (not shown), and thus airfoil 202 may be formed of contoured walls which enclose the hollow interior therein. The term "axial width" may refer to the distance from one reference point (e.g., leading edge 208) directly through airfoil 202 along axis A to another reference point (e.g., a portion of suction side surface 204). Axial width in some cases may refer to the axial distance along axis A between one location on pressure side surface 206 and a corresponding location with respect to airfoil 202. For instance, axial width may be measured as the distance along axis A from leading edge 208 to a point tangentially aligned with trailing edge 210 of airfoil 202.

As shown, structure 200 may include at least one endwall 212 (two shown) connected with airfoil 202. Structure 200 may be connected with airfoil 202 along suction side surface 204, pressure side surface 206, trailing edge 210 and leading edge 208. In various embodiments, a fillet 214 connects airfoil 202 to each endwall 212. The fillet 214 may be formed via machining from an initial structure, and in some cases fillet 214 may be formed with the aid of welding, brazing, etc.

With reference to FIGS. 1-3, in various embodiments, structure 200 can be positioned within first stage (L4) or second stage (L3). In particular embodiments, structure 200 may be positioned in second stage nozzle (L3), and the concentrated flow profile across structure 200 reduces incident fluid flow within second stage (L3), or from second stage (L3) to subsequent stages. In various embodiments, turbine 10 can include a set of blade structures 200 in only second stage (L3) of turbine 10, or in only first stage (L4) and second stage (L3) of turbine 10.

In contrast to conventional components, airfoil 202 of structure 200 may have a reduced axial width in a midspan region M as compared to the axial width of airfoil 202 in a root region R and a tip region T. The various axial widths of airfoil 202 in each region R, M, T creates an axial width differential across airfoil 202. The reduced axial width and axial width differential of airfoil 202 in midspan region M of structure 200 reduces fluid flow profile loss across midspan region M. Specific mass flow may be calculated as fluid density multiplied by fluid velocity in axial direction A. The structural details featured in embodiments of the disclosure may preserve fluid velocity of fluids passing airfoil 202 as compared to other components, and thus further preserve the specific mass flow in flowpath FP. In addition to these physical characteristics, airfoil 202 of structure 200 may include other features for controlling the flow profile of fluids within flowpath FP.

Each region R, M, T of airfoil 202 may have a corresponding radial length, or span. The radial length of each region R, M, T may be measured in meters (m), a percentage of the entire radial span of airfoil 202 between endwalls 212, and/or other units suitable for expressing the dimensions of an airfoil. Midspan region M may occupy, e.g., approximately seventy percent of the radial span of airfoil 202 between endwalls 212. Root region R and tip region T by contrast each may occupy, e.g., approximately fifteen percent of the radial span of airfoil 202. In an example of an eighty millimeter (mm) blade, root region R and tip region T may each have a vertical length of approximately twelve mm, and midspan region M may have a vertical length of approximately fifty four mm.

As shown in FIGS. 2 and 3, a blade opening D may vary with respect to radial position on airfoil 202. Blade opening D, also known as a "throat," refers to the smallest passage distance between the trailing edge of one airfoil 202 and a suction side surface 204 of another airfoil 202. The size of blade opening D may vary in each region R, M, T across airfoil 202, and be smallest in root region R and tip region T near fillet(s) 214. The size of blade opening D may be largest in midspan region M of airfoil 202. FIG. 2 also denotes an airfoil pitch P representing the circumferential distance across flowpath FP from one airfoil 202 to another airfoil. The varying size of blade opening D causes a blade opening-to-pitch ratio of airfoil 202 to be largest within midspan region 202, and thus greater than the blade opening-to-pitch ratio at root region R and tip region T. According to an example embodiment, the blade opening-to-pitch ratio of the airfoil may be at least approximately 0.32 in midspan region M, but at most approximately 0.24 in within root and/or tip regions R, T. In any case, these differences in blade opening-to-pitch ratio across airfoil 202 may concentrate a fluid flow from root region R and tip region T of structure 200 toward midspan region M, which may be desirable in some turbomachine applications.

Directing a fluid flow to midspan region M will reduce the profile and secondary losses for the blade row in question. The incidence losses onto the next blade row are thus minimized. The fluid flow profile associated with embodiments of structure 200 may be known as a controlled flow profile. In this context, controlled flow refers to the ability of structure 200 to divert airflows near root region R or tip region T of structure 200 toward midspan region M. Embodiments of airfoil 202 control the airflow profile in flowpath FP to reduce the amount of fluid near root region R or tip region T.

Figure 4:
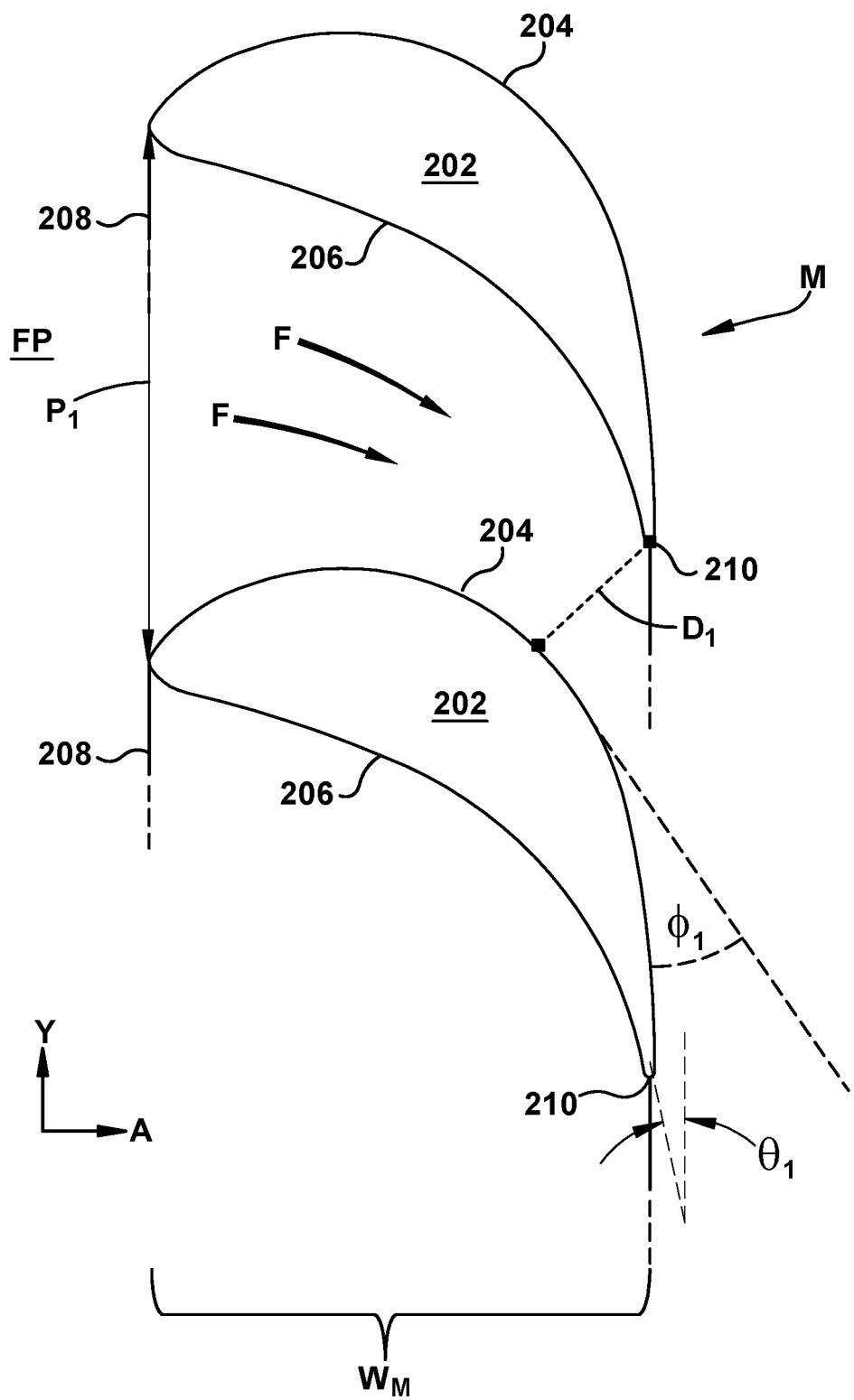
FIG. 4 shows a cut-away perspective view of the midspan region of two airfoils according to embodiments of the present disclosure.
Figure 5:
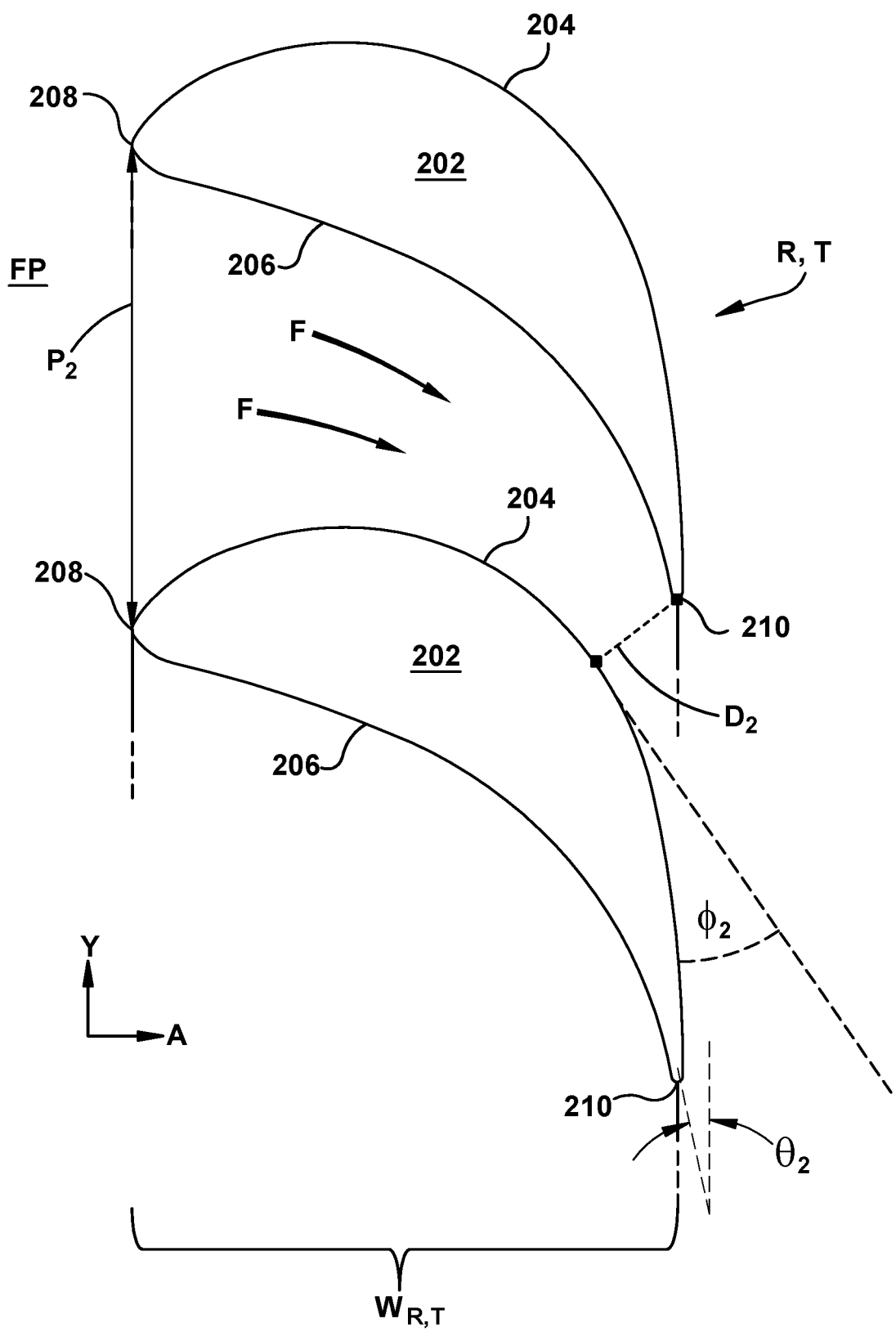
FIG. 5 shows a cut-away perspective view of the root region or tip region of two airfoils according to embodiments of the present disclosure.

Turning to FIGS. 4 and 5, partial views of two airfoils 202 are shown to demonstrate differences in their structure in various regions. Each view is shown in the plane of axial direction r and a tangential direction Y. FIG. 4 shows a portion of the two airfoils 202 across midspan region M, while FIG. 5 shows a portion of the same two airfoils 202 at root region R or tip region T. Each region R, M, T of airfoil 202 may be distinguished from each other solely based on their axial width, and may be formed as continuous portions of airfoil 202 without coupling components therebetween. Root region R and tip region T of airfoil 202 each may have a first axial width $W_{R, T}$, from leading edge 208 to trailing edge 210. Midspan region M may have a second axial width $W_M$ less than first axial width $W_{R, T}$. The difference in axial widths $W_{R, T}$, $W_M$ may create an axial width differential between the same two reference points on airfoil 202 in root or tip region(s) R, T and midspan region M. The axial width differential, during operation, reduces fluid flow profile loss across midspan region M relative to root and tip regions R, T. The reduced axial width of midspan region M as compared to root and tip regions R, T also increases the available empty space where fluid F may flow. Second axial width $W_M$ may be in the range of approximately seventy percent to approximately ninety-five percent of first axial width $W_{R, T}$.

As also discussed herein, the structure of airfoil 202 concentrates fluid flow from the opposing ends of structure 200 toward midspan region M of airfoil 202. FIG. 4 illustrates a blade opening-to-pitch ratio defined by blade opening $D_1$ and pitch $P_1$ in midspan region M. FIG. 5 illustrates a blade opening-to-pitch ratio defined by blade opening $D_2$ and pitch $P_2$ in root or tip region(s) R, T. As shown, the blade opening-to-pitch ratio in midspan region M is larger than in root or tip region(s) R, T, and thus will concentrate a majority of fluid flow within flowpath FP to midspan region M. This effect may be desirable in some turbomachine applications, e.g., to prevent incident fluid flow against downstream nozzles or blades. The proportionality of blade opening(s) $D_1$, $D_2$ to pitches $P_1$, $P_2$ of airfoil 202, and may be selected such that at least fifty percent of a total fluid flow F in flowpath FP travels across midspan region M of airfoil 202.

Referring to each of FIGS. 2-5, the axial width of airfoil 202 at midspan region M may continuously decrease from root region R or tip region T to midspan region M. Midspan region M thus includes the shortest axial width of airfoil 202, causing root region R and tip region T to have larger axial widths on airfoil 202. The axial width of airfoil 202 may vary from end-to-end along an arcuate shape such that an apex S of the arcuate profile is located within midspan region M between root region R and tip region T, as shown best in FIG. 2. According to an embodiment, leading edge 208 may exhibit an arcuate profile from root region R to tip region T. An angle β (FIG. 2 only) denoting the arcuate displacement between leading edge 208 and radial axis r may have a predetermined value, e.g., between approximately one degree and approximately five degrees. In an example, angle β in structure 200 for a static nozzle may be approximately 3.75 degrees with respect to radial axis r, while angle β in structure 200 for a rotating blade may be approximately 2.00 degrees with respect to radial axis r. Angle β may vary between implementations, e.g., to adjust the concentration of fluid flow across midspan region M relative to root region R and tip region T. The profile of trailing edge 210 may be substantially non-arcuate, or otherwise may have a reduced angular displacement from radial axis r. As shown, trailing edge may extend substantially along a straight line from root region R, midspan region M, and tip region T without affecting the difference in axial widths $W_M$, $W_{R, T}$ in each region of airfoil 202.

The structure of airfoil 202 in each region R, M, T may include additional features for controlling fluids in flowpath FP. For example, a pitch-to-axial width ratio of airfoil 202 in root region R may be structured to further concentrate fluids toward midspan region M as they flow across airfoil 202. According to an example, the ratio of pitch $P_2$ to axial width $W_{R, T}$ in root region R may be between approximately 0.7 and approximately 1.3. These characteristics of root region R, in turn, may affect the size and shape of fillet 214 to endwall(s) 212. For example, each fillet 214 may have a fillet radius FR equal to blade opening D at root region R or tip region T multiplied by 0.233. These characteristics of fillet 214, further divert operative fluids in flow path FP toward midspan region M of airfoil 202.

The cut away perspective views of each airfoil 202 in FIGS. 4 and 5 are also shown to better illustrate the angular configuration of structure 200 in embodiments of the disclosure. In airfoil design, back surface deflection (BSD) generally refers to the angular displacement between the orientation of suction side surface 204 at a throat section located, e.g., approximately at the midpoint of suction side surface 204, and approximately at the location of trailing edge 210. The BSD of airfoil 202 is denoted as angle ϕ in FIGS. 4 and 5. The BSD of midspan region M is shown as $\phi_1$ in FIG. 4, and the BSD of root region R or tip region T is shown as $\phi_2$ in FIG. 5. BSD $\phi_1$ at midspan region M may be significantly less than the BSD at root region R or tip region T. For instance, BSD $\phi_1$ of suction side surface 204 may be between approximately 31° and approximately 34°. By comparison, BSD $\phi_2$ at root region R or tip region T of airfoil 202 may be, e.g., between approximately 33° and approximately 37°.

The characteristics of structure 200 (FIGS. 2-5) may include other structural differences of airfoil 202 between midspan region M and root region R or tip region T. Another angle $\Theta_1$, sometimes known as a backform angle, denotes the displacement between the orientation of suction side surface 204 and the tangential axis Y at trailing edge 210, where suction side surface 204 and pressure side surface 206 blend together. Angle Θ may be significantly less than BSD ϕ discussed elsewhere herein because suction side surface 204 and pressure side surface 206 converge and meet at trailing edge 210. Angle Θ in midspan region M of airfoil 202 may be significantly less than in conventional airfoils. Specifically, angle $\Theta_1$ may range from approximately 0.8° to approximately 5° in midspan region M, as compared to being between approximately 3° and approximately 6° degrees at root region R or tip region T as shown through $\Theta_2$.

Returning to FIGS. 2 and 3, structure 200 may be included in a static nozzle section of a turbomachine, or alternatively in a turbine section of a turbomachine as a part of a rotatable blade structure. Structure 200 is shown in one example to be part of a static nozzle section. Here, endwalls 212 may include an inner endwall 230 mounted on shaft 14 (FIG. 1), and an outer endwall 232 mounted on the interior of a turbomachine casing (not shown). Inner and outer endwalls 230, 232 may be adapted to vertically enclose flowpath FP therebetween, and for mechanical coupling to structure 200. Structure 200 may be jointed to endwalls 230, 232 along fillet 214, with the size of fillet 214 being selected based on the characteristics of flowpath FP where structure 200 is used. Each endwall 230, 232 may be structured to include a set (i.e., one or more) static nozzles having structure 200 and airfoil 202 therein.

Figure 6:
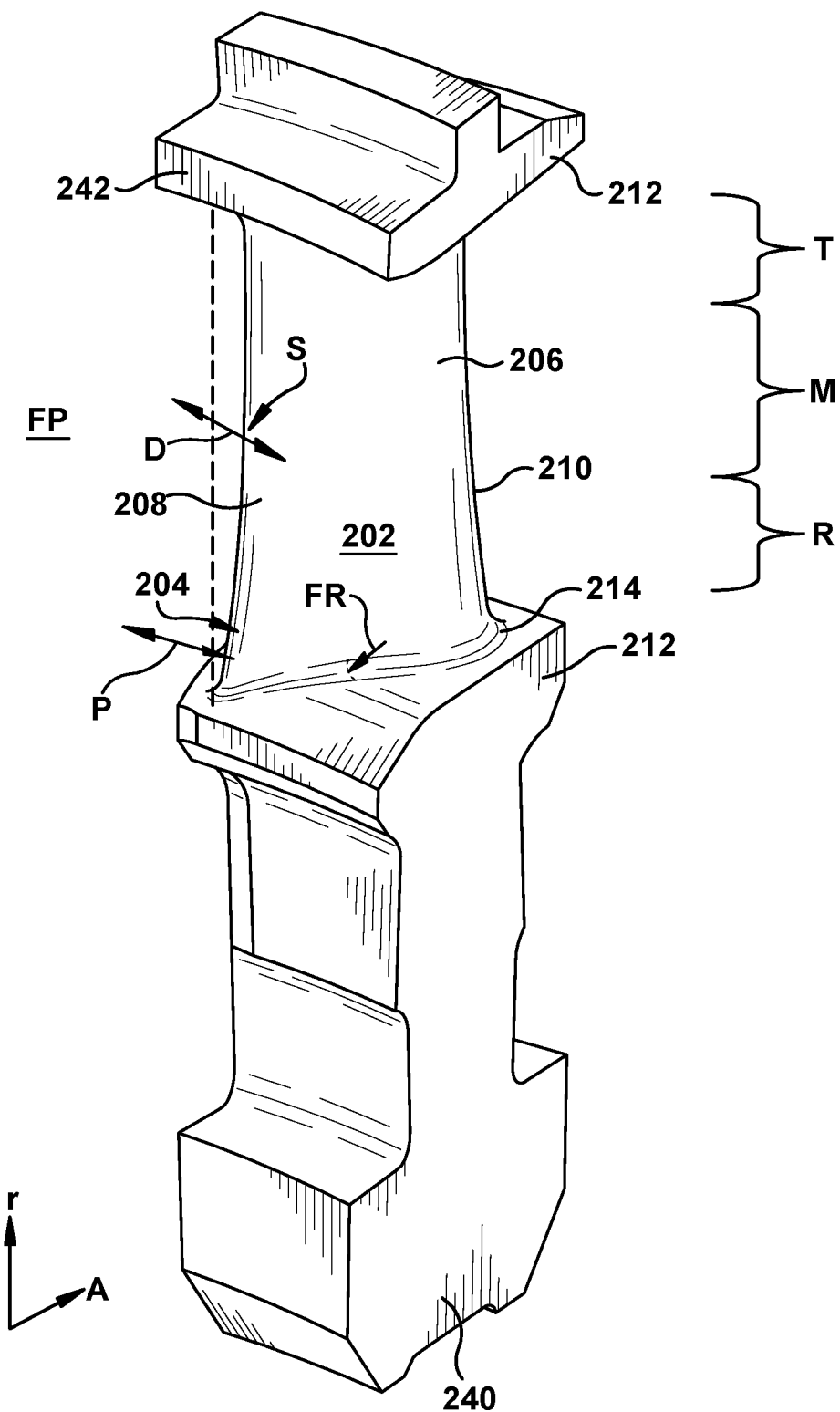
FIG. 6 shows a schematic three-dimensional depiction of a rotating turbine blade including an airfoil and endwalls according to various embodiments of the present disclosure.
Figure 7:
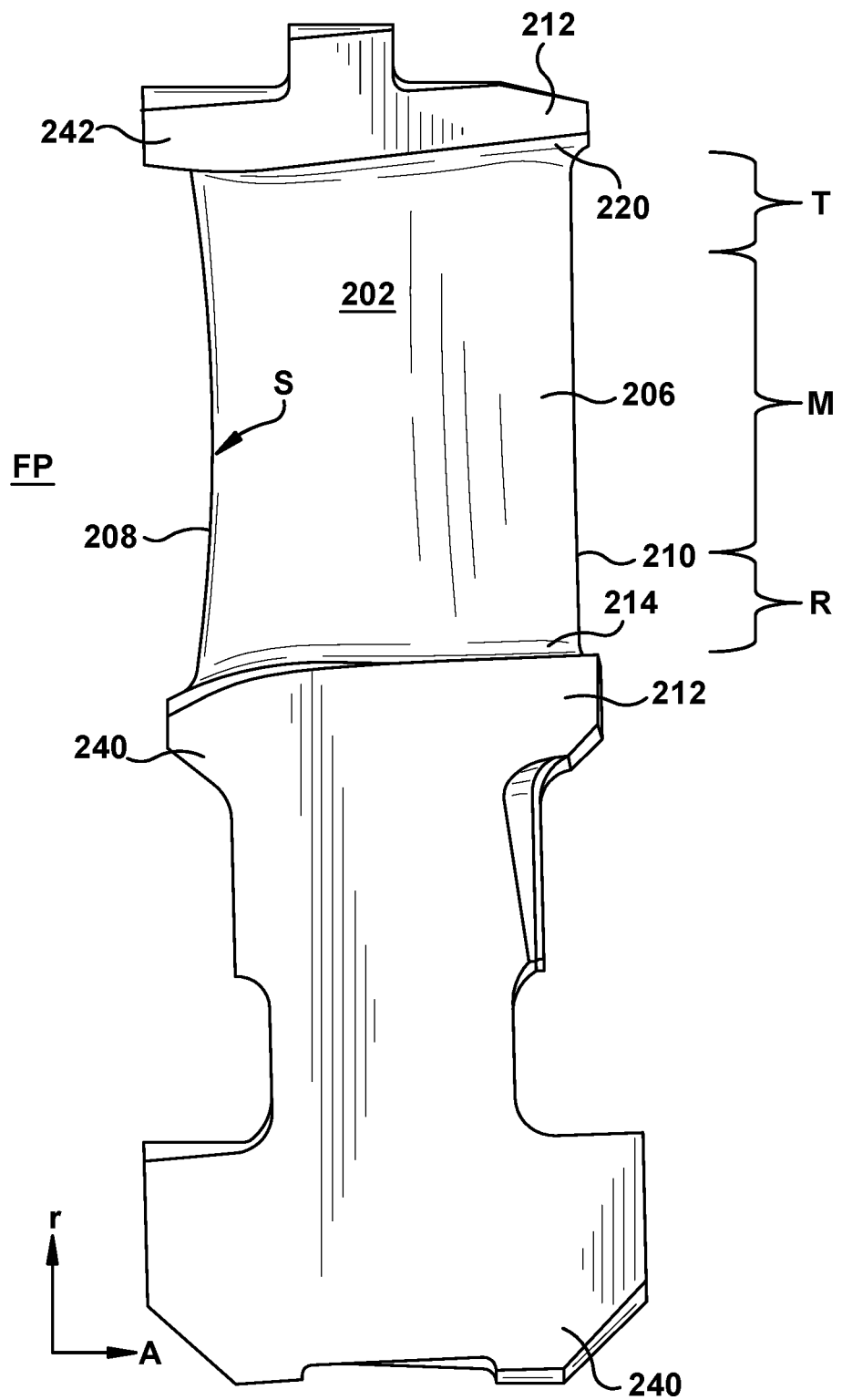
FIG. 7 shows a two-dimensional side view of a rotating turbine blade including an airfoil and endwalls according to various embodiments of the present disclosure.

Referring now to FIGS. 6 and 7, structure 200 and airfoil 202 may also be included as part of a rotating blade in a turbine section of a turbomachine. Here, airfoil 202 of structure 200 may extend radially between a root dovetail 240 and a shroud 242. Airfoil 202 may be positioned within flowpath FP between root dovetail 240 and shroud 242. Airfoil 202 may include structural features discussed elsewhere herein with respect to deployment in static nozzle sections. Specifically, airfoil 202 includes root region R, midspan region M, and tip region T with their respective axial widths. Thus, FIGS. 4 and 5 may alternatively be considered partial perspective views of airfoil 202 as shown in FIGS. 6 and 7. Root region R and tip region T are shown to have a greater axial widths than at midspan region M of airfoil 202. Structure 200 in the form of a rotating blade may also feature an arcuate profile along leading edge 208, with apex S of the arcuate profile being within midspan region R. Airfoil 202 may also include features configured for use in a rotating blade structure, but otherwise may include the same structural features shown in FIGS. 2 and 3 except where otherwise noted. Such features may include, e.g., the relative sizes and/or measurements of root region R, midspan region M, and tip region T, placement within a second stage (L3 (FIG. 1)) of a turbomachine, and/or other structural features discussed herein. For example, leading edge 208 of airfoil 202 may extend partially radially and non-perpendicularly outward from root dovetail 240 and shroud 242. This configuration of airfoil 202 may cause suction side surface 204 to have a greater length than pressure side surface 206 near root dovetail 240, while causing suction side surface 204 to have a smaller length than pressure side surface 206 near shroud 242.

It is understood that in various embodiments, other axial widths as well as various other airfoil parameters, e.g., wall apex locations, blade pitches, widths, aspect ratios between the length and/or area of various surfaces, etc., are possible. Any example values of such parameters given herein are merely illustrative of several of the many possible embodiments in accordance with the disclosure.

Figure 8:
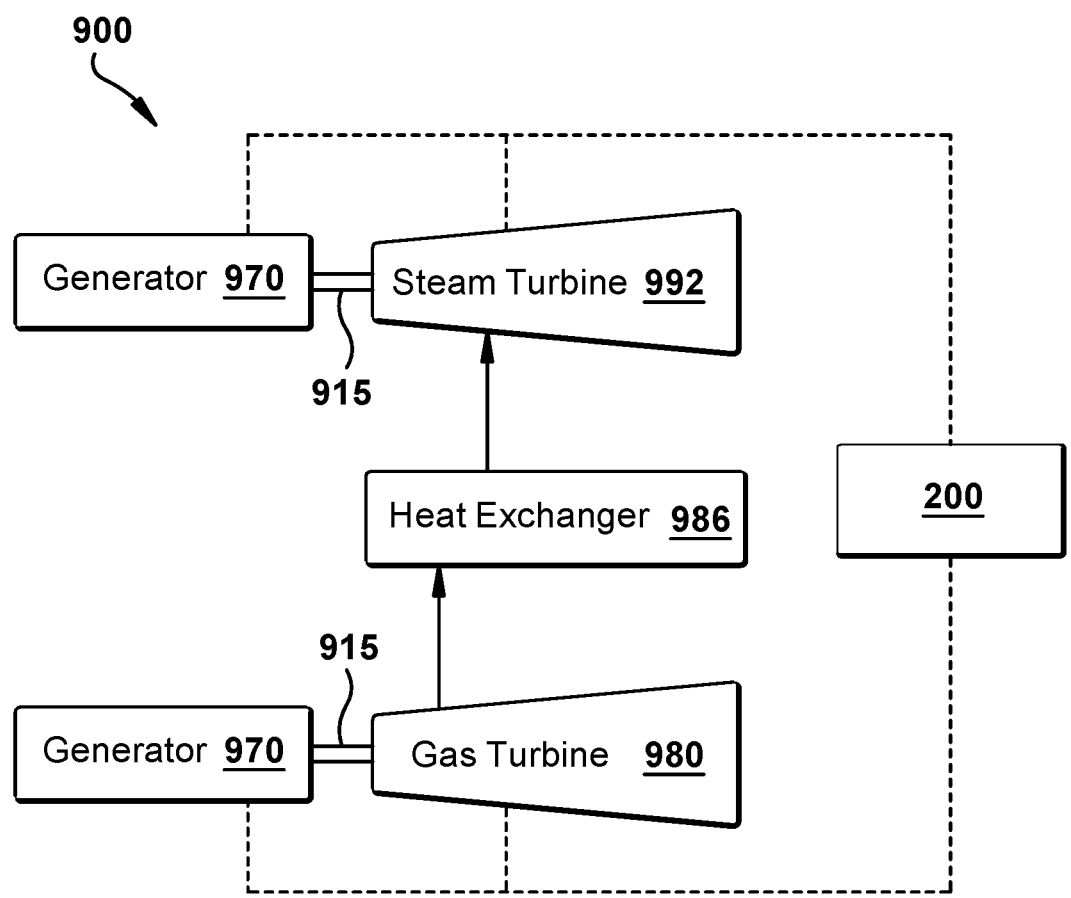
FIG. 8 shows a schematic block diagram illustrating portions of a multi-shaft power plant system according to embodiments of the present disclosure.
Figure 9:
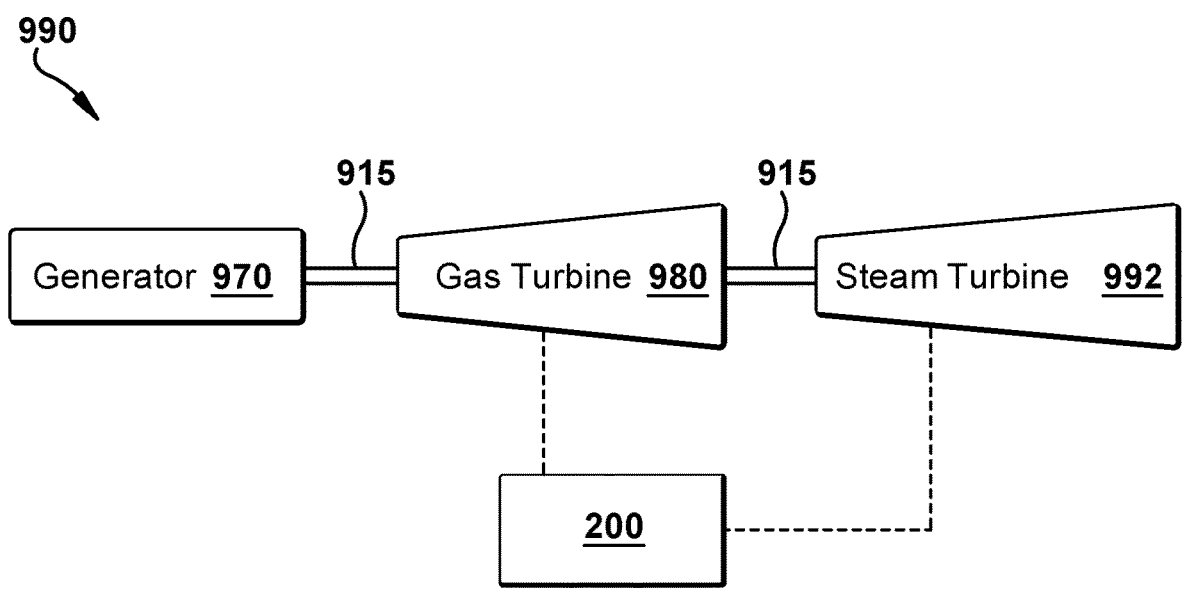
FIG. 9 shows a schematic block diagram illustrating portions of a single-shaft combined cycle power plant system according to embodiments of the present disclosure.

Turning to FIG. 8, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 5 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include one or more blade structures 200 as shown and described with reference to FIGS. 2-7 and/or other embodiments described herein. Heat exchanger 986 may be a conventional heat recovery steam generator (HRSG), such as those used in conventional combined cycle power systems. As is known in the art of power generation, heat exchanger 986 may use hot exhaust from gas turbine 980, combined with a water supply, to create steam which is fed to steam turbine 992. Steam turbine 992 may optionally be coupled to a second generator system 970 (via a second shaft 915). It is understood that generators 970 and shafts 915 may be of any size or type known in the art and may differ depending upon their application or the system to which they are connected. Common numbering of the generators and shafts is for clarity and does not necessarily suggest these generators or shafts are identical. In another embodiment, shown in FIG. 8, a single shaft combined cycle power plant 990 may include a single generator 970 coupled to both gas turbine 980 and steam turbine 992 via a single shaft 915. Steam turbine 992 and/or gas turbine 980 may include one or more structures 200 shown and described with reference to FIGS. 2-7 and/or other embodiments described herein.

The apparatus and devices of the present disclosure are not limited to any one particular engine, turbine, jet engine, generator, power generation system or other system, and may be used with other aircraft systems, power generation systems and/or systems (e.g., combined cycle, simple cycle, nuclear reactor, etc.). Additionally, the apparatus of the present invention may be used with other systems not described herein that may benefit from the increased efficiency of the apparatus and devices described herein.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent" etc.). As used herein, the term "and/or" includes any and all combinations of one or more of the associated listed items.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A blade structure adapted for placement within a flowpath of a turbomachine, the blade structure comprising:
an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region; and
at least one endwall connected with the root region or the tip region of the airfoil along the suction side, the pressure side, the trailing edge and the leading edge,
wherein the midspan region includes a reduced axial width relative to an axial width of the root region and an axial width of the tip region, and a blade opening-to-pitch ratio of the airfoil at the midspan region is greater than the blade opening-to-pitch ratio of the airfoil at the root region and the tip region to concentrate a fluid flow within the flowpath toward the midspan region of the airfoil compared to the root region and the tip region, wherein the blade opening-to-pitch ratio of the airfoil at the midspan region is at least 0.32, and wherein the blade opening-to-pitch ratio at the root region and the tip region is at most 0.24, and wherein the midspan region creates an axial width differential between the root region and the tip region that reduces fluid flow profile loss across the midspan region relative to the root region and the tip region.

2. The blade structure of claim 1, wherein the axial width in the midspan region is between seventy percent and ninety-five percent of the axial width of the airfoil at the root region or the tip region.

3. The blade structure of claim 1, wherein a Back Surface Deflection (BSD) of the suction side surface between the blade opening of the airfoil and the trailing edge of the airfoil is between 33° and 37° at the root region or the tip region of the airfoil, and between 31° and 33° at the midspan region of the airfoil.

4. The blade structure of claim 3, wherein an angle between the suction side surface at a blend point of the trailing edge, and a tangential line of the suction side surface, is between 0.8° and 5°.

5. The blade structure of claim 1, wherein the leading edge of the airfoil includes an arcuate profile between the root region and the tip region, and wherein an apex of the arcuate profile is located within the midspan region of the airfoil.

6. The blade structure of claim 1, further comprising a fillet connecting a surface of the at least one endwall to a surface of the airfoil, wherein a radius of the fillet is equal to the blade opening at the root or tip multiplied by 0.233.

7. The blade structure of claim 1, wherein a differential between the blade opening-to-pitch ratio of the airfoil at the midspan region and a differential between the blade opening-to-pitch at the root region or the tip region concentrates a majority of the fluid flow volume within the flowpath toward the midspan region of the airfoil.

8. The blade structure of claim 1, wherein a pitch-to-axial width ratio of the airfoil within the root region is between 0.7 and 1.3.

9. A static nozzle section within a flowpath of a turbomachine, the static nozzle section comprising:
a set of static nozzles, the set of static nozzles including at least one nozzle having:
an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region and
at least one endwall connected with the root region or the tip region of the airfoil along the suction side, pressure side, trailing edge and the leading edge, wherein an intersection angle between the leading edge of the airfoil and the at least one endwall is between 10 degrees and 35 degrees,
wherein the midspan region includes a reduced axial width relative to an axial width of the root region and an axial width of the tip region, and a blade opening-to-pitch ratio of the airfoil at the midspan region is greater than the blade opening-to-pitch ratio of the airfoil at the root region and the tip region to concentrate a fluid flow within the flowpath toward the midspan region of the airfoil compared to the root region and the tip region, wherein the blade opening-to-pitch ratio of the airfoil at the midspan region is at least 0.32, and wherein the blade opening-to-pitch ratio at the root region and the tip region is at most 0.24, and wherein the midspan region creates an axial width differential between the root region and the tip region that reduces fluid flow profile loss across the midspan region relative to the root region and the tip region.

10. The static nozzle section of claim 9, wherein the axial width in the midspan region is between seventy percent and ninety-five percent of the axial width of the airfoil at the root region or the tip region.

11. The static nozzle section of claim 9, wherein a Back Surface Deflection (BSD) of the suction side surface between the trailing edge of the airfoil and the blade opening of the airfoil is between 35° and 37° at the root region or the tip region of the airfoil, and 31° at the midspan region of the airfoil.

12. The static nozzle section of claim 9, wherein an angle between the suction side surface at a blend point of the trailing edge, and a tangential line of the suction side surface, is between 0.8° and 5°.

13. The static nozzle section of claim 9, wherein the leading edge of the airfoil includes an arcuate profile between the root region and the tip region, and wherein an apex of the arcuate profile is located within the midspan region of the airfoil.

14. The static nozzle section of claim 9, further comprising a fillet connecting a surface of the at least one endwall to a surface of the airfoil, wherein a radius of the fillet is equal to the blade opening of the airfoil at the root or tip multiplied by 0.233.

15. The static nozzle section of claim 9, wherein a pitch-to-axial width ratio of the airfoil within the root region is between 0.7 and 1.3.

16. A turbine section within a flowpath of a turbomachine, the turbine section comprising:
a set of rotatable blades, the set of rotatable blades including at least one blade structure having:

an airfoil including: a suction side; a pressure side opposing the suction side; a leading edge between the pressure side and the suction side; a trailing edge opposing the leading edge and between the pressure side and the suction side; a root region at a first radial end; a tip region at a second radial end opposite the first radial end; and a midspan region between the root region and the tip region and at least one endwall connected with the root region or the tip region of the airfoil along the suction side, pressure side, trailing edge and the leading edge, wherein an intersection angle between the leading edge of the airfoil and the at least one endwall is between 2.5 degrees and 20 degrees, wherein the midspan region includes a reduced axial width relative to an axial width of the root region and an axial width of the tip region, and a blade opening-to-pitch ratio of the airfoil at the midspan region is greater than the blade opening-to-pitch ratio of the airfoil at the root region and the tip region to concentrate a fluid flow within the flowpath toward the midspan region of the airfoil compared to the root region and the tip region, wherein the blade opening-to-pitch ratio of the airfoil at the midspan region is at least 0.32, and wherein the blade opening-to-pitch ratio at the root region and the tip region is at most 0.24, and wherein the midspan region creates an axial width differential between the root region and the tip region that reduces fluid flow profile loss across the midspan region relative to the root region and the tip region.

17. The turbine section of claim 16, wherein the axial width in the midspan region is between seventy percent and ninety-five percent of the axial width of the airfoil at the root region or the tip region.

18. The turbine section of claim 16, wherein a Back Surface Deflection (BSD) of the suction side surface between the trailing edge of the airfoil and the blade opening of the airfoil is between 33° and 35° at the root region or the tip region of the airfoil, and 32° at the midspan region of the airfoil.

19. The turbine section of claim 16, wherein an angle between the suction side surface at a blend point of the trailing edge, and a tangential line of the suction side surface, is between 0.8° and 5°.

* * * * *